United States Patent
Hsieh et al.

(10) Patent No.: US 8,947,209 B2
(45) Date of Patent: Feb. 3, 2015

(54) RADIO FREQUENCY IDENTIFICATION SYSTEM USING MULTIPLE BAND TRANSMISSION

(75) Inventors: Yuan-Ning Hsieh, Hsinchu (TW); Ta-Yung Lee, Hsinchu (TW); Shin-Yao Perng, Hsinchu (TW)

(73) Assignee: Getac Technology Corporation, Hsinchu County (TW)

( * ) Notice: Subject to any disclaimer, the term of this patent is extended or adjusted under 35 U.S.C. 154(b) by 760 days.

(21) Appl. No.: 12/260,984

(22) Filed: Oct. 29, 2008

(65) Prior Publication Data

US 2010/0102933 A1    Apr. 29, 2010

(51) Int. Cl.
- *H04Q 5/22* (2006.01)
- *G08B 1/08* (2006.01)
- *G08B 13/14* (2006.01)
- *G06K 7/00* (2006.01)
- *G06K 7/10* (2006.01)

(52) U.S. Cl.
CPC .......... *G06K 7/0008* (2013.01); *G06K 7/10069* (2013.01); *H04Q 2213/13003* (2013.01)
USPC ..... 340/10.2; 340/10.1; 340/10.3; 340/539.1; 340/572.1; 340/572.9

(58) Field of Classification Search
USPC ........ 340/10.2–10.5, 572, 10.1, 10.31, 10.32, 340/12.1, 13.2
See application file for complete search history.

(56) References Cited

U.S. PATENT DOCUMENTS

| | | | |
|---|---|---|---|
| 4,827,395 A * | 5/1989 | Anders et al. | 700/9 |
| 5,434,572 A * | 7/1995 | Smith | 342/44 |
| 6,509,828 B2 * | 1/2003 | Bolavage et al. | 340/10.1 |
| 6,617,962 B1 * | 9/2003 | Horwitz et al. | 340/10.4 |
| 7,009,515 B2 * | 3/2006 | Carrender | 340/572.1 |
| 7,116,212 B2 * | 10/2006 | Horwitz et al. | 340/10.1 |
| 7,196,613 B2 * | 3/2007 | Horwitz et al. | 340/10.1 |
| 7,482,926 B2 * | 1/2009 | Pillai | 340/572.1 |
| 7,710,239 B2 * | 5/2010 | Kranz | 340/10.1 |
| 2007/0262866 A1 * | 11/2007 | Eveland | 340/572.7 |
| 2008/0083832 A1 * | 4/2008 | Chang et al. | 235/492 |
| 2008/0218351 A1 | 9/2008 | Corrado et al. | |

FOREIGN PATENT DOCUMENTS

WO    2008/027650 A2    3/2008

* cited by examiner

*Primary Examiner* — Daniell L Negron
*Assistant Examiner* — Mancil Littlejohn, Jr.

(57) ABSTRACT

A radio frequency identification (RFID) system employs multiple band transmission to prevent signal collision. The system includes a plurality of RFID tag groups and at least one RFID reader. Each RFID tag group includes at least one RFID tag. The RFID tags of the same RFID tag group are operated for radio frequency transmission in the same transmission frequency band, and those of different RFID tag groups are operated for radio frequency transmission in different transmission frequency bands. When the RFID reader simultaneously receives radio frequency signals issued from RFID tags of different RFID tag groups, since they are transmitted in different transmission frequency bands, signal collision among the RFID tags of the RFID tag groups can be avoided.

6 Claims, 4 Drawing Sheets

RADIO FREQUENCY IDENTIFICATION SYSTEM USING MULTIPLE BAND TRANSMISSION

BACKGROUND OF THE INVENTION

1. Field of the Invention

The present invention relates to a radio frequency identification system that is capable of preventing signal collision, in particular, to a radio frequency identification system with multi-band transmission for preventing signal collision.

2. Related Art

A radio frequency identification (RFID) system is an advanced technology that identifies an object by transmitting data through radio frequency and generally consists of an RFID tag and an RFID reader.

In certain applications, the RFID reader may need to read multiple RFID tags at the same time and such a situation often leads to collision of tag signals. The readability of tag signals can be enhanced if the RFID tags are read one by one. However, it is often that a number of RFID pass by an RFID reader at the same time, and in such a situation, it becomes vitally important to properly handle collision of tag signals.

Signal collision occurring in an RFID system can be classified as two categories, namely tag signal collision and reader signal collision. The former represents the situation where a RFID reader simultaneously receives signals returned from a number of RFID tags, leading to imprecise receiving of signals or incorrect result of reading, while the later indicates the situation where interference is caused by a tag receiving instructions from a number of readers at the same time. Signal collision simply results in failure and/or missing of signal transmission, or even leads to incorrect data due to incorrect reading of signals, both being hindering the operation of correct identification.

The state-of-art solution for handling signal collision occurring in RFID tag transmission is the so-called time division multiple access (TDMA), wherein RFID readers are controlled to carry out signal transmission at different time points. However, such a solution is only good for RFID systems that are comprised of RFID readers of small numbers and once the number of the RFID readers installed reaches an upper limit, the reliability and performance of the system get lowered due to over division of time within a given time period.

SUMMARY OF THE INVENTION

In view of the discussion given above, the present invention aims to provide an RFID system that uses multiple band transmission to prevent signal collision, wherein a method that carries out frequency shift for RFID tags returning tag signals to avoid signal collision is employed to ensure no signal collision occurring when RFID tags transmit tag information back to an RFID reader.

In accordance with the present invention, an RFID system that uses multiple band transmission to prevent signal collision is provided, comprising a plurality of groups of RFID tags and at least one RFID reader. The RFID tag group comprises at least one RFID tag. The RFID tags belonging to the same RFID tag group are operated with radio frequency transmission within the same transmission frequency band, while the RFID tags of different RFID tag groups use different transmission frequency bands to carry out radio frequency transmission. Each RFID tag comprises a microprocessor connected to a memory unit and a radio frequency transmission/reception module for transmitting and receiving a radio frequency signal in a predetermined transmission frequency band. The RFID reader comprises a microprocessor connected to a memory unit and a multiple-band radio frequency transmission/reception module. The multiple-band radio frequency transmission/reception module can alternatively comprise a plurality of radio frequency transmission/reception modules for transmitting/receiving radio frequency signals respectively corresponding to the transmission frequency bands of the RFID tag groups. Since the RFID tags of the RFID tag groups are operated with different working frequencies, no signal collision between the RFID tags of different RFID tag groups may occur when the RFID tags of the different RFID tag groups are transmitting/receiving radio frequency with respect to the RFID reader at the same time.

Through simple measure of hardware design, the solution provided by the present invention effectively eliminates occurrence of signal collision in applications where the number of RFID tags of an RFID system is increased and thus ensures system reliability and integrity of data transmission and reduces the chance of incorrect reading and data missing. Further, the cost for installing additional RFID readers in an RFID system can be substantially reduced, effectively lowering down the overall hardware installation cost of the RFID system.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE PREFERRED EMBODIMENTS

Figure 1:
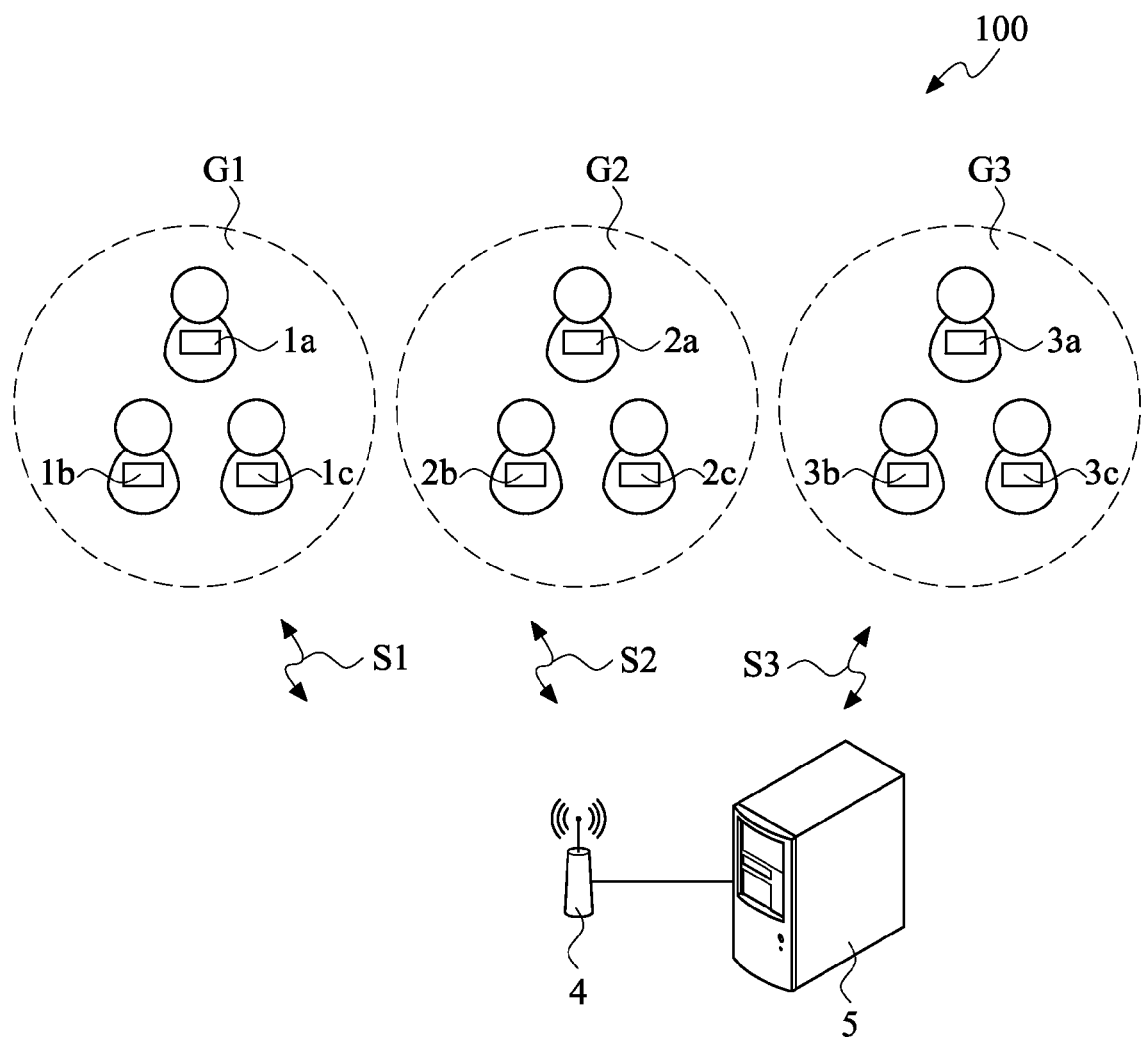
FIG. 1 shows a schematic view of a first embodiment in accordance with the present invention.

Reference will now be made in detail to the present preferred embodiments of the invention, examples of which are illustrated in the accompanying drawings. Wherever possible, the same reference numbers are used in the drawings and the description refers to the same or the like parts.

FIG. 1 shows a schematic view of a first embodiment in accordance with the present invention. As shown, an RFID (Radio Frequency Identification) system 100 comprises a plurality of groups of RFID tags, respectively labeled G1, G2, G3. The RFID tag group G1 is comprised of RFID tags 1a, 1b, 1c; the RFID tag group G2 is comprised of RFID tags 2a, 2b, 2c; and the RFID tag group G3 is comprised of RFID tags 3a, 3b, 3c. The RFID tags of the same RFID tag group are operated with radio frequency transmission within a given transmission frequency band, but RFID tags belonging to different RFID tag groups carry out operation of radio frequency transmission with different transmission frequency bands. Due to the fact that radio frequency transmission may be subjected to frequency drift caused by components aging or external interference, the transmission frequency band is set to cover a given reference frequency and a positive frequency interval and a negative frequency interval added on opposite sides of the reference frequency, so that undesired miss of signal transmission can be avoided. Thus, each RFID tag group G1, G2, G3 are capable to communicate with an RFID reader 4 through radio frequency signals S1, S2, S3 at different frequency bands respectively for transmitting data to a controller host 5 through the RFID reader 4. Three RFID tag groups are taken as an example in the embodiment illustrated, yet it is apparent to those skilled in the art that the number of the RFID tag groups is not limited to such an example.

Figure 2:
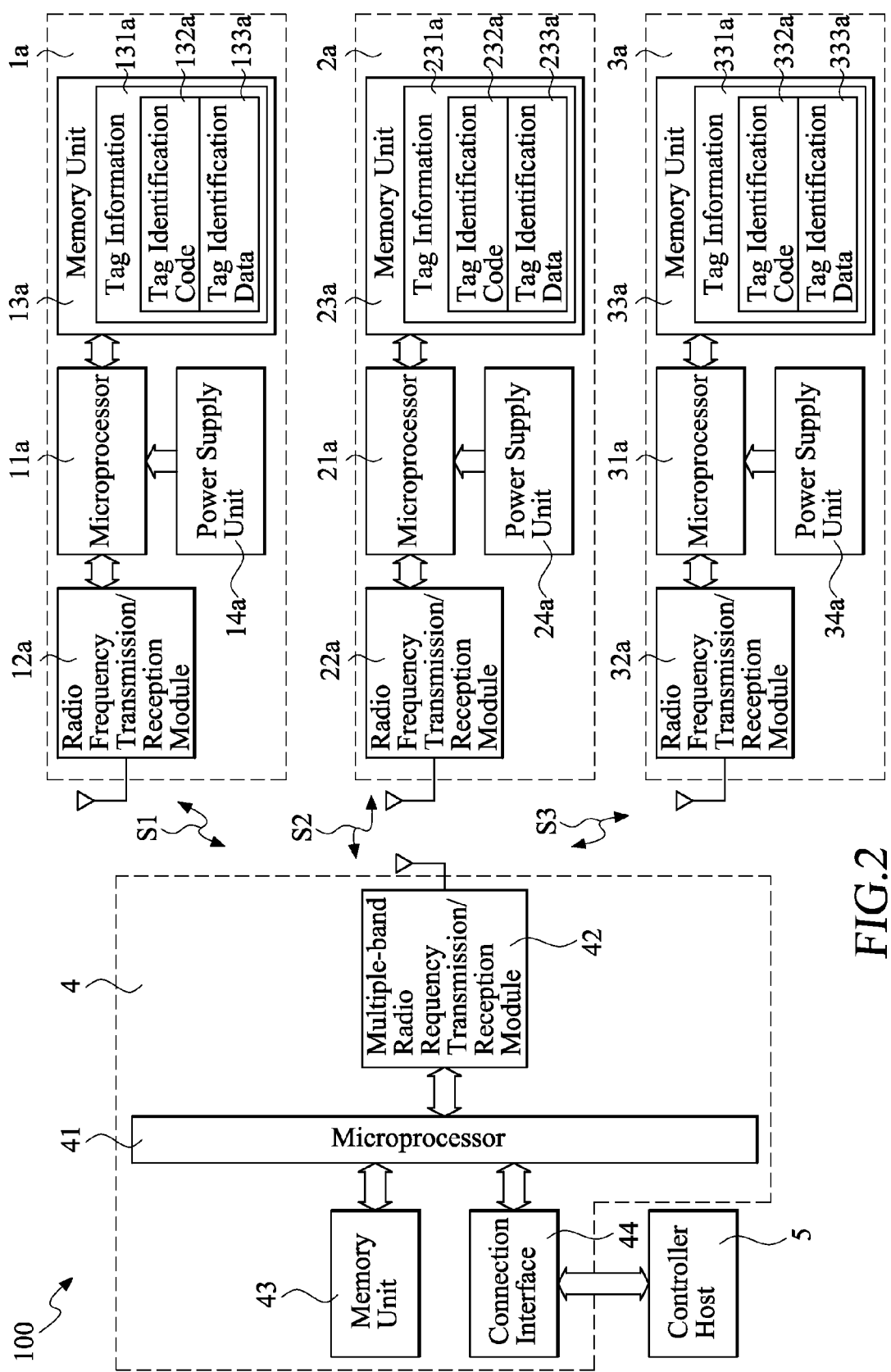
FIG. 2 shows a system block diagram of the first embodiment of the present invention.

Referring to FIG. 2, which illustrates a system block diagram of the first embodiment of the present invention, the illustration given by FIG. 2 is based on one of the RFID tags constituting the RFID tag groups G1, G2, G3 shown in FIG. 1 and the RFID tag 1a of the RFID tag group G1 will be taken as an example for description here. The RFID tag 1a comprises a microprocessor 11a connected to a radio frequency transmission/reception module 12a, a memory unit 13a, and a power supply unit 14a. The memory unit 13a stores tag information 131a, which includes a tag identification code 132a and tag identification data 133a.

Similarly, an RFID tag 2a of the RFID tag group G2 comprises a microprocessor 21a connected to a radio frequency transmission/reception module 22a, a memory unit 23a, and a power supply unit 24a. The memory unit 23a stores tag information 231a, which includes a tag identification code 232a and tag identification data 233a.

Also, similar to the RFID tag 1a of the RFID tag group G1 and the RFID tag 2a of the RFID tag group G2, an RFID tag 3a of the RFID tag group G3 comprises a microprocessor 31a connected to a radio frequency transmission/reception module 32a, a memory unit 33a, and a power supply unit 34a. The memory unit 33a stores tag information 331a, which includes a tag identification code 332a and tag identification data 333a.

The radio frequency transmission/reception module 12a, 22a, 32a of the respective RFID tag 1a, 2a, 3a is operated within a respective predetermined transmission frequency band for transmitting and receiving the radio frequency signal S1, S2, S3 at different transmission frequency bands and to transmit the tag identification code 132a, 232a, 323a and the tag identification data 133a, 233a, 333a of the RFID tag 1a, 2a, 3a through the radio frequency signal S1, S2, S3.

The tag identification data 133a, 233a, 333a contains various information, including for example available tag power (which can be used to evaluate residual of power), tag mode (which can be used to determine if the tag is in a sleeping mode or an operation mode), data of firmware version (which can be used to update version of firmware), data of software version (which can be used to update version of software), transmission bandwidth (which can be used to determine the frequency to be used), transmission power (which can be used to determine transmission power), data of authenticity (which can be used to filter out counterfeit tags), tag owner (which indicates the owner of the tag), and tag group (which indicates the department to which the tag belongs).

The RFID reader 4 comprises a microprocessor 41 connected to a multiple-band radio frequency transmission/reception module 42, a memory unit 43, and a connection interface 44. The multiple-band radio frequency transmission/reception module 42 functions to transmit and/or receive a radio frequency signal S1, S2, S3 in the predetermined transmission frequency band corresponding to each RFID tag group G1, G2, G3. The connection interface 44 connects to the controller host 5 to transmit received data to the controller host 5 for storage or subsequent processing.

Figure 3:
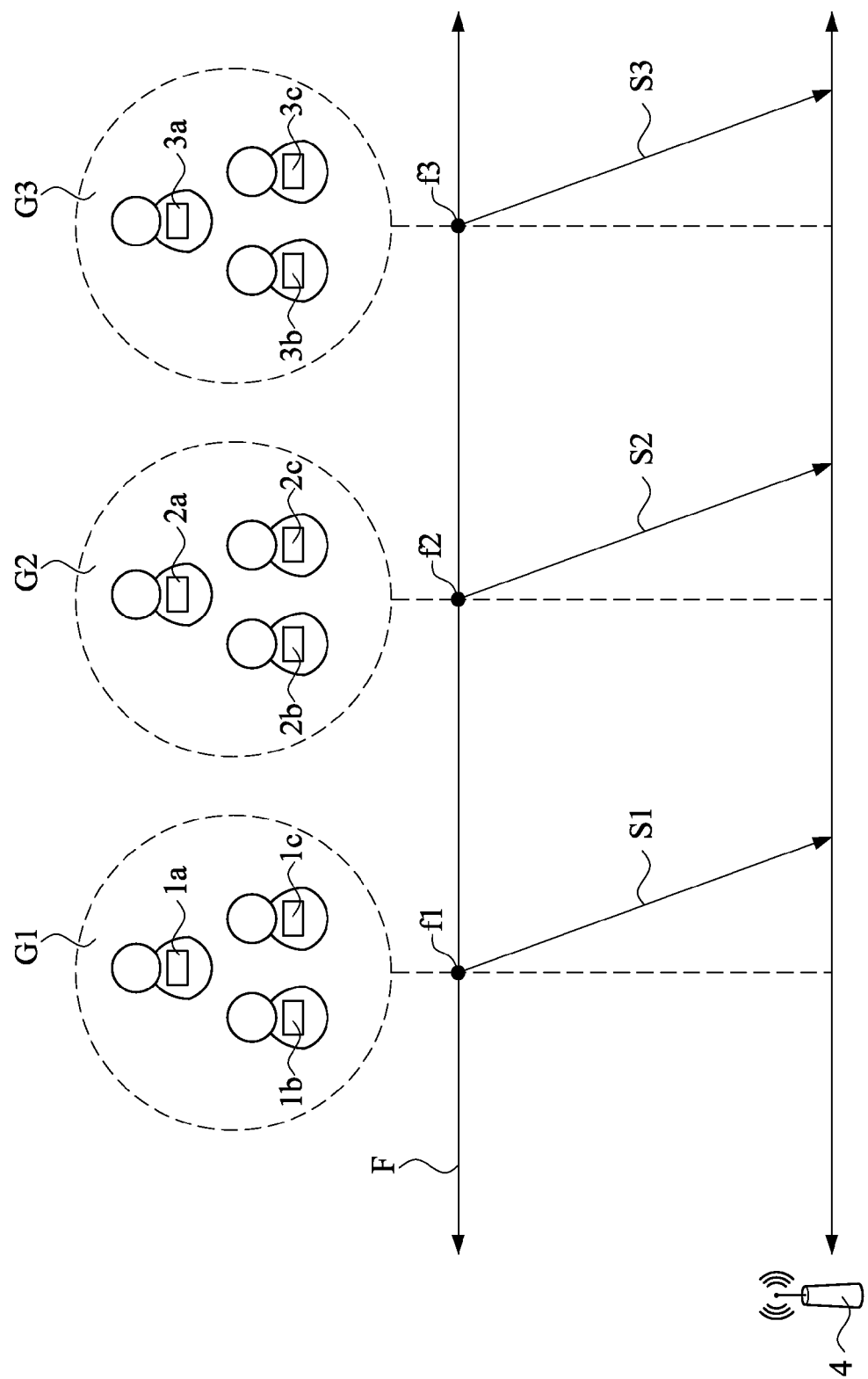
FIG. 3 is a schematic view illustrating transmission of radio frequency signals of RFID tags of the first embodiment of the present invention.

Referring to FIG. 3, which is a schematic view illustrating transmission of radio frequency signals of the RFID tags of the first embodiment of the present invention, as shown, since each RFID tag group G1, G2, G3 carries out radio frequency transmission within different transmission frequency band, such transmission frequency bands are indicated as frequency points f1, f2, f3 in a frequency axis F. In the embodiment illustrated, the RFID tags 1a, 1b, 1c, 2a, 2b, 2c, 3a, 3b, 3c of each RFID tag group G1, G2, G3 are active RFID tags, which obtain the desired electrical power for operation from the power supply units thereof to actively transmit the radio frequency signals S1, S2, S3. When the RFID reader 4 attempts to receive the radio frequency signals S1, S2, S3 from the RFID tag groups G1, G2, G3, since these radio frequency signals use different transmission frequency bands and, additionally, since a safety frequency margin is preset between the transmission frequency bands, signal collision occurring due to the RFID tag groups G1, G2, G3 being operated at the same frequency can be effectively eliminated. It is apparent to those skilled in the art that although the embodiment discussed takes the active RFID tag as an example, the present invention is equally applicable to passive RFID tag.

Figure 4:
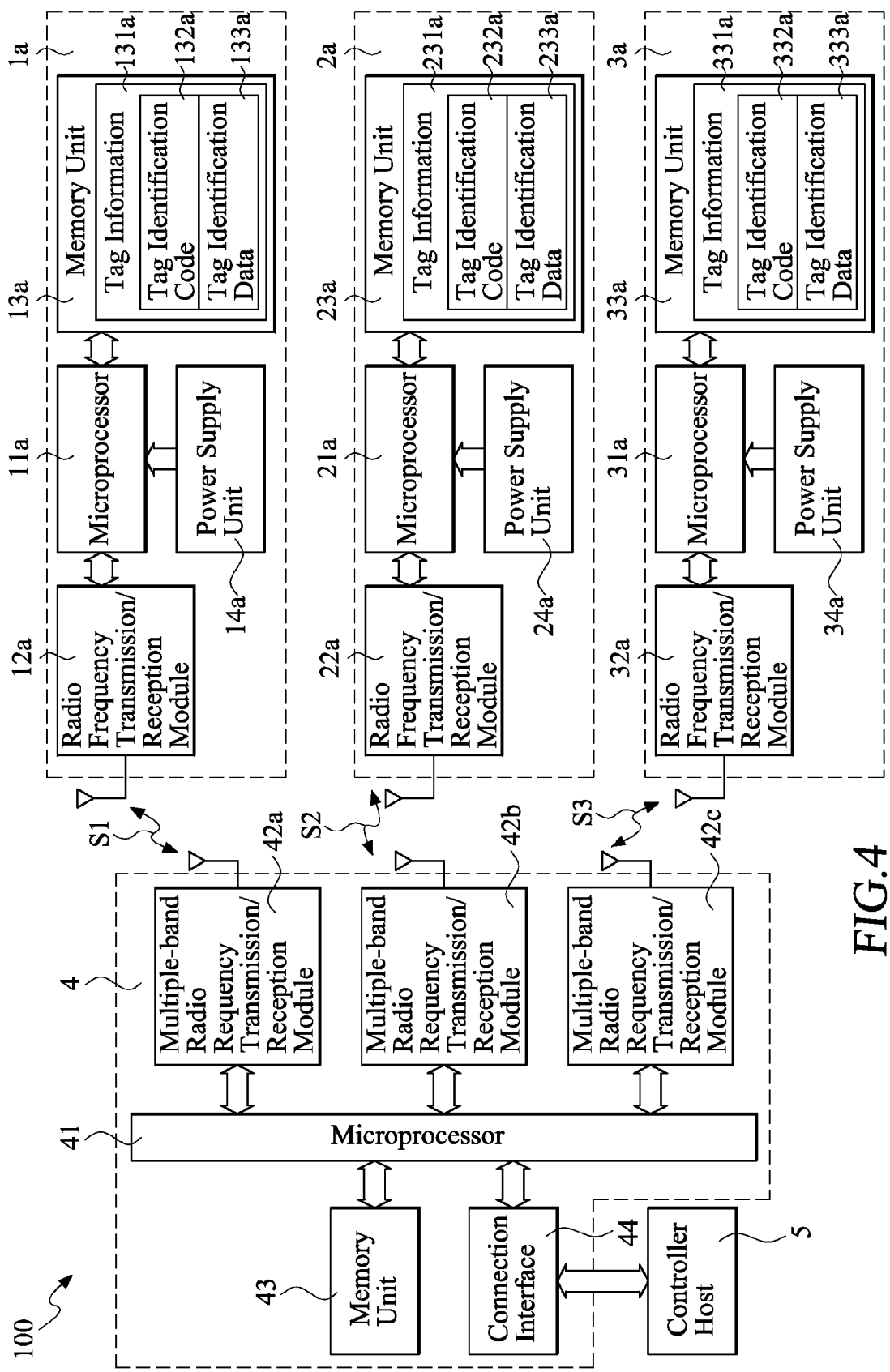
FIG. 4 shows a system block diagram of a second embodiment in accordance with the present invention.

Referring to FIG. 4, which shows a system block diagram of a second embodiment in accordance with the present invention, as shown, the system provided by the second embodiment of the present invention is substantially identical to that of the first embodiment, so that identical components will bear the same reference numerals and the description thereof will be omitted. Once again, an RFID system in accordance with the second embodiment, which is broadly designated at 100', comprises an RFID reader 4a that comprises a microprocessor 41 connected to a plurality of radio frequency transmission/reception modules 42a, 42b, 42c, a memory unit 43, and a connection interface 44.

The constituent components of the second embodiment are of substantially identical functions of the counterparts thereof in the first embodiment and a difference resides in that the RFID reader 4a of the second embodiment uses the plurality of radio frequency transmission/reception modules 42a, 42b, 42c to respectively mate the transmission frequency bands of the RFID tag groups G1, G2, G3 for transmitting/receiving tag information 131a, 231a, 331a of the RFID tags 1a, 2a, 3a of the respective RFID tag groups G1, G2, G3. The measure that is taken by the second embodiment to avoid signal collision between the RFID tag groups G1, G2, G3 is similar to that of the first embodiment, and repeated description will be omitted herein.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A radio frequency identification system that employs multiple band transmission to prevent tag signal collision, comprising:

a plurality of RFID tag groups, each comprising a plurality of RFID tags each containing tag information, the RFID tags of each RFID tag group being set to operate in a respective predetermined transmission frequency band; and at least one RFID reader, which comprises a single multiple-band radio frequency transmission/reception module operating only in the predetermined transmission frequency bands for transmitting/receiving the tag information of the RFID tags of the RFID tag groups, wherein the predetermined frequency bands are separated only by a safety frequency margin and wherein each RFID tag has an operating frequency which is not used by any other RFID tag.

2. The radio frequency identification system as claimed in claim 1, wherein the RFID tag comprises a microprocessor that is connected to a memory unit and a radio frequency transmission/reception module.

3. The radio frequency identification system as claimed in claim 2, wherein the microprocessor of the RFID tag is connected to a power supply unit that supplies electrical power desired by the RFID tag.

4. The radio frequency identification system as claimed in claim 1, wherein the tag information comprises a tag identification code and tag identification data.

5. The radio frequency identification system as claimed in claim 4, wherein the tag identification data comprises one of available tag power, tag mode, data of firmware version, data of software version, transmission bandwidth, transmission power, data of authenticity, tag owner, and data of group to which the tag belongs or a combination thereof.

6. The radio frequency identification system as claimed in claim 1, wherein the RFID reader comprises a connection interface that connects a controller host.

* * * * *